H. W. CONNELL.
DIFFERENTIAL MECHANISM.
APPLICATION FILED MAR. 14, 1913.
1,217,918.
Patented Mar. 6, 1917.
2 SHEETS—SHEET 2.
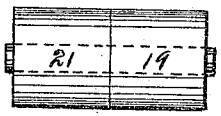
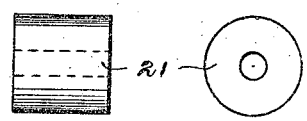
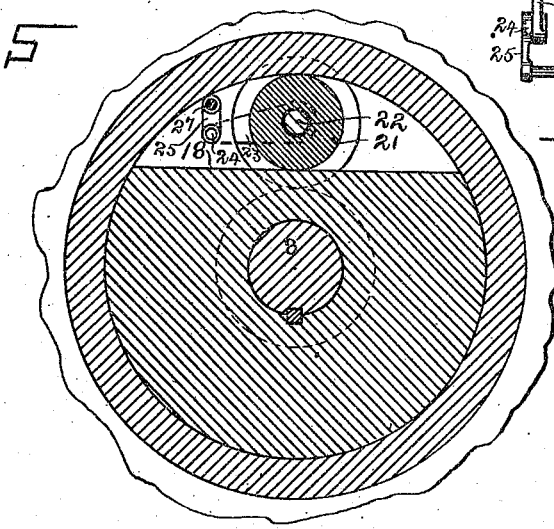
WITNESSES
INVENTOR
ATTORNEY

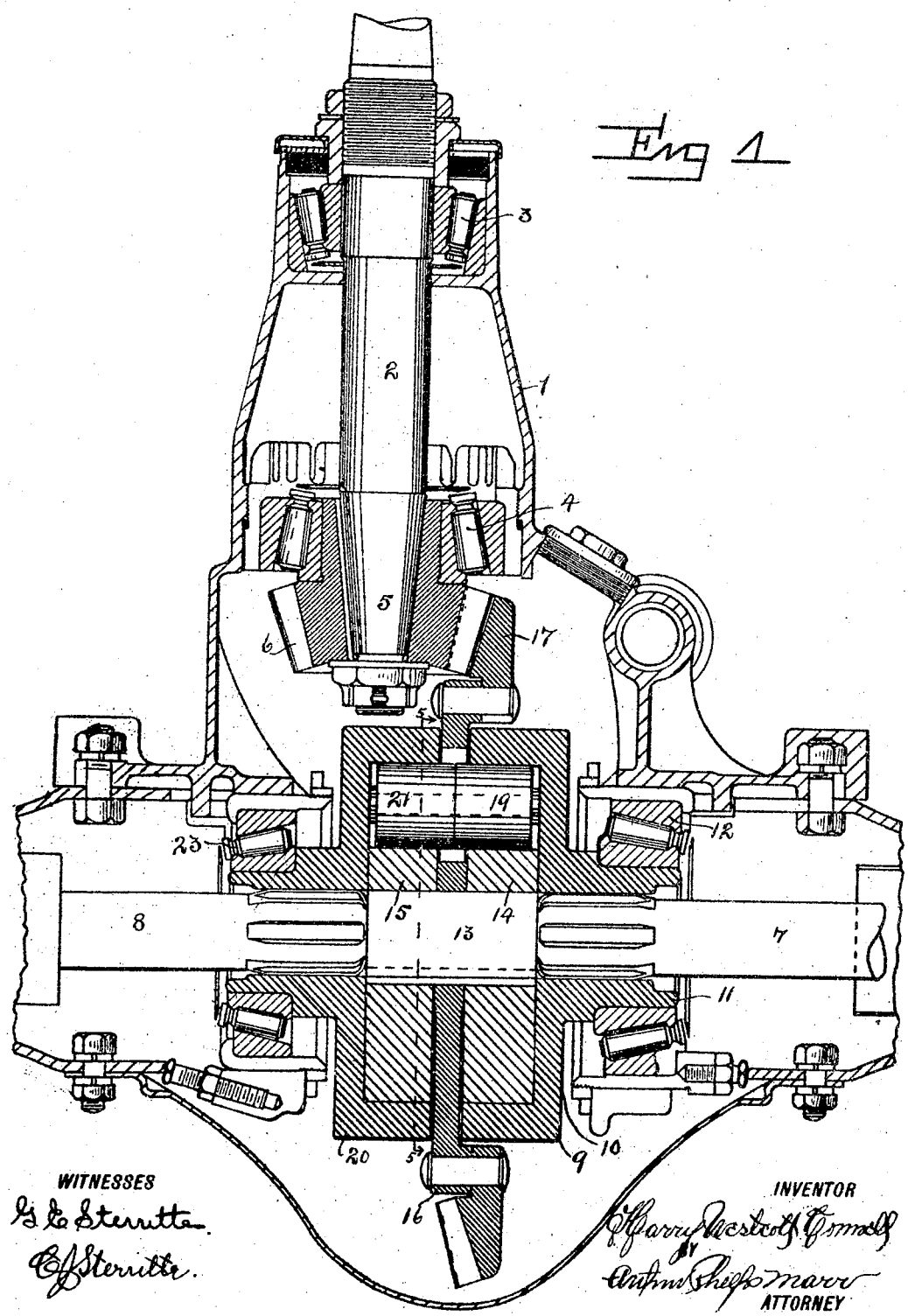

UNITED STATES PATENT OFFICE.

HARRY W. CONNELL, OF BLOOMFIELD, NEW JERSEY.

DIFFERENTIAL MECHANISM.

1,217,918.    Specification of Letters Patent.    Patented Mar. 6, 1917.

Application filed March 14, 1913. Serial No. 754,228.

*To all whom it may concern:*

Be it known that I, HARRY WESTCOTT CONNELL, a resident of the city of Bloomfield, county of Essex, State of New Jersey, have invented certain new and useful Improvements in Differential Mechanisms, of which the following is a specification.

A differential mechanism is called upon to perform duties peculiar to itself and it ofttimes happens that much destruction and even loss of life may result from the failure of the differential to quickly respond to the ever changing condition. So as to eliminate as far as possible the chance of failure through the breaking of the parts or the maladjustment thereof I have discarded the many small gears with their numerous teeth that are found in the ordinary differential and have substituted therefor a ring and disk which retain between them a smooth roller. All of these parts may be made of the finest grade of delicately tempered steel and may be of a size sufficient to withstand many times the strain ordinarily applied to a differential.

It will be seen that in addition to changing all of the parts I have also made a very decided change in the manner of operation of differentials for although one of the shafts, or rather one side of the main shaft, may be free to race ahead if occasion shall require it, it will be found in my device that the power will always be applied to the laggard wheel or rather to the slow shaft. In this way should a wheel attached to one of the shafts have a tendency to slip the traction power will be wholly centered in the other the slower wheel and the engine driving the wheels through the differential will not race.

Like ordinary differentials this device is entirely automatic in its action regardless of the direction of rotation of the parts, but unlike ordinary differentials the engine cannot advance beyond the slowest wheel nor can both wheels advance beyond the engine, a circumstance that makes possible in my construction a factor of safety, a coefficient of utility and a strength not found in differentials of the gear type, regardless of their particular style or construction.

The following is what I consider the best means of carrying out this invention.

The accompanying drawings form a part of this specification, in which—

Figure 1 shows in elevation partly in section the casing and contained therein driving and driven shafts with the gears and bearings therefor, and my differential mechanism in its proper place.

Fig. 2 shows in side and end elevation the rollers used in my device.

Fig. 2ª is an end elevation of the roller.

Fig. 3 shows in side and end elevation the pin upon which the rollers are mounted.

Fig. 3ª is an end elevation of the pin.

Fig. 4 shows in side and end elevation a single roller.

Fig. 4ª is an end elevation of the roller shown in Fig. 4.

Fig. 5 is a section on the line 5—5 in Fig. 1 and viewed in the direction of the arrow. It shows a disk and a ring together with a roller that coöperates therewith.

Fig. 6 shows in plan the shaft for the rollers 19 and 21 and the steadying links attached thereto.

Similar reference numerals indicate like parts in all the figures where they appear.

In describing my device even as it is shown in the drawings I do not consider it necessary to set forth in detail such parts as are well known and particularly those that in my construction require no change or modification. I will therefore indicate by the reference numeral 1, the exterior casing, and at 2 the driving shaft arranged therein. This driving shaft is supported upon a plurality roller bearings as indicated at 3 and 4 and secured to the lower tapered end 5 is a bevel gear 6.

At right angles to the driving shaft, the driven shafts are arranged as shown at 7 and 8. These shafts extend outward from the center and may support at their ends ordinary traction wheels such, for instance, as are used on an automobile, and it will be noted that the casing 1 is caused to inclose a certain portion of each of these shafts in the well known and ordinary manner.

In describing my differential mechanism I desire to call attention to the fact that it is a duplex structure having two exactly similar sets of parts and I will describe these parts in rotation leaving the functions thereof to be set forth in the description of the operation.

Secured to or keyed upon the shaft 7 I arrange a cup or flanged member 9, cylindrical in cross section though having one end, the right end as shown closed as shown at 10. I perforate this closure however directly through its center for the reception of the shaft 7, and I surround this perforation with a ring 11 which may be formed integral with the member. Secured to this ring and supported in the part of the casing 1 adjacent thereto is a roller bearing 12 which supports the member 9 and the shaft therein.

In line with the shaft 7 I arrange a short length of shaft 13, and secured to this shaft are the disks 14 and 15 having between them the plate 16 to which the bevel gear 17 is secured. The disks 14 and 15 are flat and approximately circular in plan, but as shown in Fig. 5 I have cut away a portion of each disk so as to produce a plane 18. The member 9 surround the disk 14, and in the open space between the member 9 and the disk 14, which I have produced by cutting away a portion of the disk, I place a roller 19.

I have arranged a second cupped and flanged member 20 similar in all respects to the member 9, surrounding the disk 15 and I have placed a second roller 21 in line with the roller 19, and have arranged it between the disk 15 and the member 20. Each of these rollers 19 and 21 are centrally perforated and through the perforation in the rollers I extend a shaft 22, shown in detail in Fig. 6, and provided with the outwardly extending arms 23, 23 one arranged at each end and each provided at its outermost end with a pin 24.

Upon these pins 24 I loosely engage links 25 and 26 and I connect these links by means of a shaft or rod 27 that will be secured in each link, and that will when the device is in operation bear lightly upon the inner periphery of the flange of the members 9 and 20. By this means I assure that the rollers 19 and 21 shall remain in alinement although they are free to revolve independently of each other. A roller bearing 23 supports the member 20 and the shaft 8 secured therein.

Thus far I have described the separate members of my device. I might add however that the members 9 and 20, the disks 14 and 15 and the rollers 19 and 21 should be formed of a good grade of steel properly tempered, though in my experiments I have descovered that low steel case-hardened on its wearing surfaces will operate satisfactorily.

In describing the operation of the device I will again refer to the parts by their numerals.

The engine, or other motive power may be connected to the outer end of the shaft 2. Rotating this shaft will cause the bevel-gear 6 to drive the gear 17 and as this gear is keyed to the short shaft 13, this short shaft will be revolved together with the disks 14 and 15, which are also keyed to this shaft. A slight motion of either disk or of both will cause the rollers resting upon the plane between the disks and the cupped members surrounding them, to become securely wedged between the disks and the flanges of the members 9 and 20. These members, and the shafts 7 and 8 secured therein will then also be caused to turn and this motion will continue until upon rounding a curve one of the shafts is induced to travel faster than the other, this forward motion imparted to the cupped or flanged member secured thereto will cause it to disengage from the surface of the roller, holding it, and as the roller will find itself unable to advance with the flanged member it cannot exert its pinching force and the flanged member may then run free independent of the driving mechanism.

When, however the fast traveling wheel again assumes its normal speed, or endeavors to close down below the normal the roller will wedge once more between the cupped member and the flange and assure that the wheel will travel at the speed determined by the speed of the engine or motor.

My device may also assist the brakes in checking the speed of the traction wheel as its construction positively prohibits both wheels traveling ahead of the driving mechanism as an attempt to do so on their part will advance the rollers over the center line of their adjacent disks causing them to pinch or wedge in the same manner as though they were forced ahead by their respective disks. This also demonstrates the fact that my differential mechanism will be equally effective regardless of the direction of travel of the engine.

At Fig. 3 I have shown a shaft 32 that may be substituted for the shaft 22. This shaft 32 is not provided with the extending arms 23, 23 nor the pins 24, as I have found that, given the proper mechanical fit and a small amount of clearance at each end the roller will maintain a position that would be found satisfactory under most conditions.

Although I prefer the device as shown and described it is evident that modifications may be made within the scope of the appended claims without departing from the principle or sacrificing the advantages of this invention.

Having carefully and fully described my invention what I claim and desire to secure by Letters Patent is:—

1. A differential mechanism having a plurality of disks rotatable simultaneously and means for rotating them, each said disk having a part removed to provide a flattened surface, a cupped member receiving each of said disks, a roller between the flattened surface of each disk and the adjacent cupped member, said rollers being arranged upon a common shaft a projection from each end of said shaft, a link extending from each said projection and a bar connecting said links, said bar being adapted to bear upon the inner periphery of each said cupped member as and for the purpose set forth.

2. A differential mechanism having a plurality of disks, a portion of the outer edge of which is removed, a cupped shaped member receiving each said disk, and upon the inner periphery of which the circular portion of the disk is adapted to bear, rollers arranged in alinement with each other and adapted to forcibly engage the periphery of a disk with its adjacent cup all arranged as and for the purpose set forth.

3. In a differential mechanism a plurality of shafts a driving gear secured to one of said shafts, a driven gear secured to another said shaft, said driven gear being provided with an aperture therethrough, and a plurality of disks secured to said shaft, rollers upon said disks having their ends adjacent and projecting through said driven gear and flanged members adapted to be differentially driven by said rollers as herein specified and for the purpose set forth.

4. A differential having in combination a plurality of disks each having approximately one third of its periphery removed to provide a single flat face, flanged members receiving each said disk and a roller between each said flattened surface and the adjacent flanged member, said rollers being adapted to forcibly engage each said disk with its adjacent flanged member by the rotation of both disks or both flanged members and to disengage either said disk from its flanged member by an increase of speed in either of said flanged members.

Signed at New York city, in the county and State of New York this 20th day of February 1913.

H. W. CONNELL.

Witnesses:
Al. H. Graham,
G. E. Sterritt.